Dec. 26, 1950  C. F. DALE  2,535,392
MINNOW FISH BAIT
Filed Oct. 31, 1949

Charles F. Dale
INVENTOR.

BY *Clarence A. O'Brien*
*and Harvey B. Jacobson*
Attorneys

Patented Dec. 26, 1950

2,535,392

UNITED STATES PATENT OFFICE 2,535,392

MINNOW FISH BAIT

Charles F. Dale, Mayhill, N. Mex.

Application October 31, 1949, Serial No. 124,605

3 Claims. (Cl. 43—26.2)

This invention relates to an artificial lure or bait simulating a minnow or other type of fish, the primary object of which is to animate the lure in response to a pull on the line attached to the lure.

A further object of this invention is to provide a fish lure having a body to which is pivoted a head, side fins, and a tail, all of which will move synchronously in response to a pull on a line attached to the head, the movement of these parts simulating the movment of the head, tail and fins of a minnow.

Yet another object of this invention is to provide a fish lure or bait of the character described which is relatively simple in design and construction, cheap to assemble and manufacture in large quantities, easy to attach to a line, and very efficient for its intended purpose.

Another feature of this invention is to provide a lure of the character described in which several side fins and the tail carry hooks which are more or less concealed in these parts and are consequently deceptive to the natural fish.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views, in the accompanying drawings and in the following specification, similar reference characters indicate corresponding elements throughout.

Figure 1:
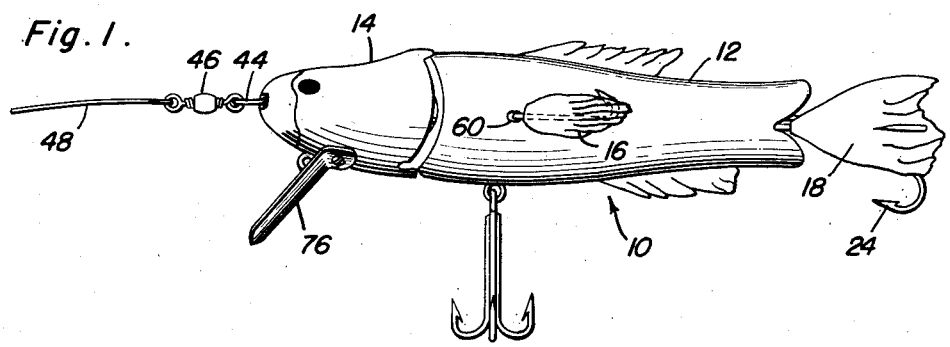
Figure 1 is a side elevational view of the lure.
Figure 2:
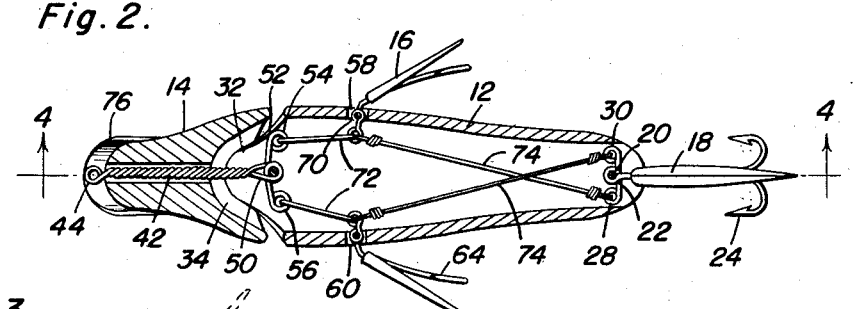
Figure 2 is a sectional view taken substantially in the plane of section line 2—2 of Figure 4.

The fish lure of the present invention is generally indicated at 10 and comprises a hollow body portion 12, a head portion 14, side fins 16, and a tail portion 18. The shape and configuration of these parts, as well as the decorations thereon, are made to simulate a fish such as a minnow, as will be readily understood by those skilled in this art.

Carried by the body portion 12 of the lure adjacent the rear end thereof is a pin 20, the tail 18 having an eye 22 which embraces the pin for pivotal movement thereon in a horizontal plane.

Extending from the sides of the tail 18 are hooks 24. Welded or riveted to the eye portion 22 of the tail 18 is a frame 26 having terminal eye portions 28 and 30 for a purpose to be later described.

Figure 4:
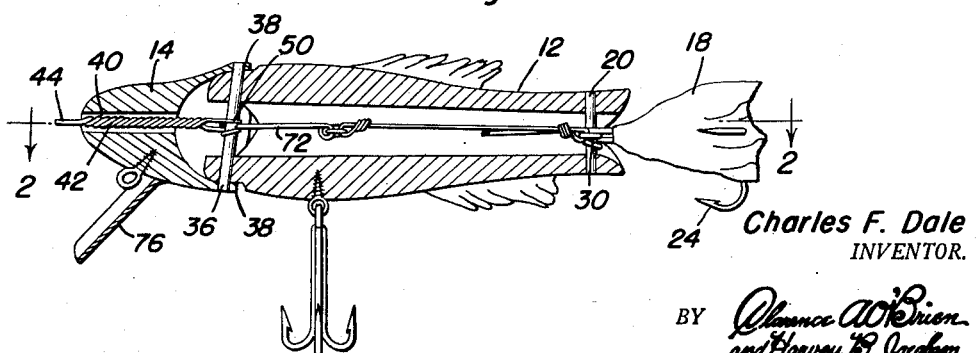
Figure 4 is a sectional view taken substantially in the plane of section line 4—4 of Figure 2.

The front portion of the body 12 is provided with a reduced extension 32 which is received in a socket 34 of the head 14 and a second vertical pin 36 extends through the body 12 adjacent the reduced portion, as is shown clearly in Figure 4. The rear portion of the head 14 is provided with top and bottom apertured portions 38 which are received on the free extensions of the pin 36 so that the head is pivotal upon the pin 36 in a horizontal plane. The head is provided with a longitudinal bore 40 through which extends a twisted wire 42 having an eye 44 at its forward end for receiving a conventional swivel 46 carried by a line or leader 48. The rear end of the wire 42 is twisted to form an eye 50 which embraces the pin 36 for pivotal movement thereon. Welded or riveted to the eye 50 is a frame 52 similar in construction and design to the frame 26 which is also provided with terminal eyes 54 and 56.

Apertures 58 and 60 are provided in the sides of the body 10 intermediate its end and small rods 62 are secured to the body in the apertures. The fins 16 carrying hooks 64 each has an angular extension 66 carrying at its free end an eye 68. Intermediate the ends of the angular extensions 66 is an eye 70 which is received on the rods 62 so that each of the pins 16 is horizontally pivotal about these rods.

Wires 72 interconnect the eyes 54 and 56 with the eyes 68 of the fins while cross wires 74 interconnect the eyes 68 with the eyes 28 and 30 of the plates 26 secured to the tail 18. As will be seen clearly in the drawings, the wires, eyes and frames are all disposed within the hollow body 12 of the fish lure.

Figure 3:
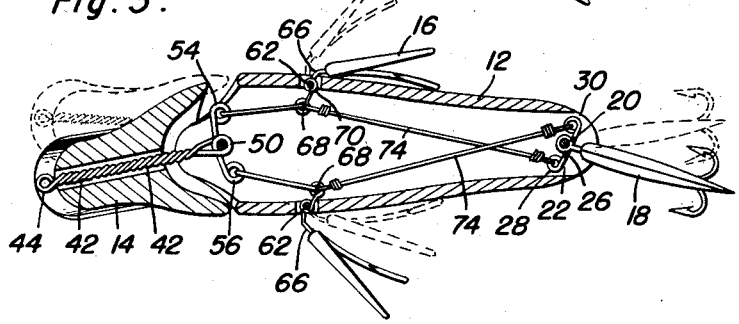
Figure 3 is a sectional view similar to that shown in Figure 2 and illustrating a different position of the head, fins, and tail.

In practical operation, after the line or leader 48 is secured to the head at the eye 44, and a sidewise pull is exerted on the line, the head, fins and tail will pivot in horizontal planes in unison to simulate the natural movement of a fish such as a minnow, the dotted line positions shown in Figure 3 clearly indicated the type of movement obtained. To obtain a rippling effect of the water about the artificial fish lure of the present invention, a downwardly and forwardly inclined baffle plate or spoon 76 may be secured to the head as will be readily understood by those skilled in the art.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An animated artificial fish lure comprising a body portion, tail, head and fins, all configurated to simulate a fish, means for attaching said head to a line, and means operatively interconnecting said head, tail and fins whereby said head, tail and fins wiggle in unison in response to a side pull on said head, said means including a first vertical pin extending through said body portion at its front end and receiving said head at its ends for pivotal movement of said head in a horizontal plane, a second vertical pin extending through the rear end of said body portion, said tail being pivoted on said second pin for pivotal movement in a horizontal plane, and link means interconnecting said head, tail and fins.

2. The combination of claim 1 wherein said fins include extensions passing through the sides of said body portion and pivoted thereto intermediate their ends, one of the ends of each extension being secured to said link means for actuation thereby.

3. The combination of claim 2 wherein said link means includes a first frame secured to said head and horizontally pivotal intermediate its ends on said first pin within said body portion, links interconnecting the ends of said first frame and the inner ends of said fin extensions, a second frame secured to said tail and horizontally pivotal intermediate its ends upon said second pin within said body portion and cross-links interconnecting the ends of said second frame and the inner ends of said fin extensions.

CHARLES F. DALE.

REFERENCES CITED

The following references are of record in the file of this patent:

UNITED STATES PATENTS

| Number | Name | Date |
|---|---|---|
| 588,729 | Harris | Aug. 24, 1897 |
| 1,402,798 | Ryan | Jan. 10, 1922 |
| 2,038,829 | Cronin | Apr. 28, 1936 |
| 2,472,505 | Yocam et al. | June 7, 1949 |
| 2,478,655 | Davis | Aug. 9, 1949 |